2,769,542

BENEFICIATION OF BAUXITE

John Congdon Russell, Kitwe, Northern Rhodesia, and James Stephen Kennedy, Stamford, Conn., assignors to American Cyanamid Company, New York, N. Y., a corporation of Maine No Drawing. Application April 3, 1953,
Serial No. 346,777

9 Claims. (Cl. 209—166)

This invention relates to an improved method of beneficiating bauxite ore by froth flotation.

The problem of bauxite ore beneficiation has been a serious one because of the low unit value of the product and the fact that while it is not difficult to float bauxite, the procedures employed have resulted in poor selectivity in that the concentrate contained considerable combined silica.

According to the present invention, bauxite is floated away from silica gangues by means of water-dispersible sulfonated petroleum hydrocarbons. The bauxite ore is ground and deslimed in the presence of sodium silicate. This deslimed bauxite ore is then conditioned in an acid circuit with a petroleum sulfonate and subjected to froth flotation. The flotation concentrate may be cleaned to advantage if the best possible grade of bauxite is required.

Petroleum sulfonates or derivatives thereof which are suitable for use according to the process of the present invention are commercially available under a variety of designations; among those found to be useful are "Petronate" and "O-Emulsifier," obtainable from L. Sonneborn Sons; "Eldrol" and "Petrosul," obtainable from Pennsylvania Oil Products Refining Co.; Sherwood "Reagent 407," obtainable from Sherwood Refining Co.; "Ultranate No. 2," obtainable from Atlantic Refining Co.; and "SP–1," "SP–302," and "SP–312," obtainable from Stanco Distributors, Inc.

However, the commercially available, sulfonated petroleum hydrocarbons may be divided on a solubility basis into two distinct groups. One of these is the group variously known as "mahogany" acids, "mahogany" soaps, and the like. This group is characterized in that its constituents are generally oil-soluble but water-dispersible. Usually, but not necessarily, these compounds have a deep mahogany color when in solution, which gives rise to the generic designation as "mahogany" compounds.

The other group is generally, but not necessarily, characterized by a green coloration in solution. Hence, compounds of this group are usually referred to as "green sulfonic" acids or "green" soaps. More important than the color distinction, however, is the fact that the so-called "green" compounds are characterized by being water-soluble.

So far as the present invention is concerned, either group, or a mixture thereof, may be used. The water-soluble petroleum sulfonates appear to have certain undesirable frothing properties which interfere with selectivity. In the process of this invention, this difficulty is readily overcome by the addition of an amount of a more hydrophobic material. This may be done by adding an oil in suitable quantity or by mixing some of the oil-soluble petroleum sulfonates with the water-soluble type.

The water- and oil-soluble petroleum sulfonates are used under definite conditions and the present invention is limited to their use under such conditions and does not cover the use of these reagents generally. According to the present invention, the ore must be conditioned with the reagent in the presence of a strong acid. The effectiveness of the acid treatment is not apparently dependent upon the nature of the acid anion insofar as it does not have a particular depressant effect and almost any strong or fairly strong acid may be used, either inorganic or organic. The limit of effectiveness appears to lie with acids having an ionization constant of about 10 to −7. Sulfuric acid gives excellent results and because of its extremely low cost is the preferred acid.

The mechanics whereby the presence of an acid with petroleum sulfonates affects the surface of the particles has not as yet been fully determined and the present invention is not intended to be limited to any particular theory of action. It is important to note that a practical advantage of the present invention lies in the fact that although an acid circuit is required, the pH of the circuit is not critical providing the acid used is strong enough.

Water-soluble petroleum sulfonates and acid alone do not appear to give optimum results, and we have found that conditioning in the presence of an oil is desirable for best recoveries and grades. It is an advantage of the present invention that the nature of the oil is not particularly critical. Excellent results are obtained with various hydrocarbon products such as various grades of fuel oil and even crude oil. Since these oils are among the cheapest commercially available materials, they may be considered as the preferred oils to be used in the process of the present invention.

Conditioning and flotation procedure is not materially changed by the present invention, which is a further practical advantage, as no new operating techniques need to be learned. The ore may be conditioned either at high or low solids, and well-known conditioning equipment may therefore be used. Special apparatus is unnecessary, except to the extent that the conditioning apparatus should be resistant to corrosion.

In common with almost all froth flotation operations on non-sulfide ores, slimes are a detriment. In the process of the present invention, the desliming operation may be economically effected by treating the slime-containing ore with sodium silicate or other commonly used slime-dispersing agents such as sodium hydroxide, tetrasodium pyrosphosphate, lignin sulfonates and the like, and washing until the removal of slimes is essentially complete.

It is an important advantage of the process of the present invention that it is applicable to practically all the ordinarily-occurring bauxite ores and is not restricted to certain particular ores. As in the case of most froth flotation operations, however, results will differ with different ores. It is an advantage that concentrations of usable grade may be produced from low-grade ore having a combined silicate content of the order of 12 or 13%. It is also an advantage that the process is so highly selective that in many cases concentrates of certain grade are obtained in a rougher operation. However, with many ores, and particularly with low-grade ores, cleaning and even re-cleaning of the rougher concentrate is advantageous. In common with froth flotation experience in other ores, the precise flowsheet for best results will vary somewhat from ore to ore, and should be in accordance with best ore-dressing practice. The lack of criticalness of the present process, however, makes the choice of plant and procedure simple and no operating difficulties are encountered.

The flotation may be conducted at the usual pulp densities, i. e., from 10–30% solids and may be carried out in any suitable flotation machine. Where high outputs are required, we have found that the use of highly developed flotation machines of the mechanical type, such as Fagergren flotation machines, are desirable, but the invention is not limited thereto.

Another advantage of the present invention lies in the fact that the flotation concentrate may be tabled to separate the heavy materials, for example, iron and titanium oxides, from the bauxite. While this additional tabling step is not necessary to the efficient operation of our process, it does result in separating the heavy materials and gives a bauxite product of very high alumina content. In the case of some bauxite ores, it is of considerable commercial importance that the table concentrate contains ilmenite, zircon and columbium in appreciable amounts. To our knowledge, a columbium concentrate has never been obtained from bauxite ore by the flotation and tabling processes of this invention.

The invention will be described in greater detail in conjunction with the following specific examples. In the examples, all flotations are effected in Fagergren flotation machines operating at normal speeds and with normal air intake.

*Example 1*

A bauxite ore analyzing 53.93% $Al_2O_3$, 0.98% $Fe_2O_3$, 4.03% $TiO_2$, 14.04% $SiO_2$ and having a loss on ignition of 26.99%, was ground to +35 mesh, treated with 4 lbs./ton $Na_2SiO_3$ and deslimed. The deslimed and washed ore was then conditioned for 2 minutes at 60% solids with 6.0 lbs./ton of a water-soluble petroleum sulfonate, 6 lbs. per ton fuel oil and 2 lbs./ton sulfuric acid. The conditioned ore was diluted to 14% solids with water and floated for 2½ minutes. The pH during flotation was about 3.1. The cleaned and recleaned flotation concentrate had the following analyses:

| Product | Percent Weight | Assays | | | | |
|---|---|---|---|---|---|---|
| | | Percent $Al_2O_3$ | Percent $Fe_2O_3$ | Percent $TiO_2$ | Percent $SiO_2$ | Loss on Ignition |
| Calculated Head | 100.0 | 52.42 | 1.00 | 4.00 | 16.45 | 26.12 |
| Cleaned Concent | 76.9 | 58.61 | 1.16 | 4.92 | 5.50 | 29.81 |
| Cleaner Tailings | 9.5 | 41.89 | 0.35 | 1.50 | 37.38 | 18.98 |
| Rougher Tailing | 13.6 | 24.79 | 0.56 | 0.58 | 63.76 | 10.31 |
| Distribution, Percent | | | | | | |
| Calculated Head | 100.0 | 100.0 | 100.0 | 100.0 | 100.0 | 100.0 |
| Cleaned Concentrate | | 86.0 | 89.1 | 94.5 | 25.7 | 87.7 |
| Cleaner Tailings | | 7.6 | 3.3 | 3.5 | 21.6 | 6.9 |
| Rougher Tailing | | 6.4 | 7.6 | 2.0 | 52.7 | 5.4 |

*Example 2*

The ore of Example 1 was processed in a similar manner, except that 5 lbs./ton oil-soluble petroleum sulfonate was substituted for the fuel oil and water-soluble petroleum sulfonate. The cleaned and recleaned flotation concentrate had the following analyses:

| Product | Percent Weight | Assays | | | | |
|---|---|---|---|---|---|---|
| | | Percent $Al_2O_3$ | Percent $Fe_2O_3$ | Percent $TiO_2$ | Percent $SiO_2$ | Loss on Ignition |
| Calculated Head | 100.0 | 52.29 | 1.17 | 4.53 | 17.17 | 24.82 |
| Cleaned Concentrate | 58.9 | 59.55 | 1.60 | 6.43 | 3.48 | 28.93 |
| Cleaner Tailings | 7.9 | 51.99 | 0.58 | 2.76 | 19.30 | 25.37 |
| Rougher Tailing | 33.2 | 39.50 | 0.55 | 1.58 | 40.97 | 17.40 |
| Distribution, Percent | | | | | | |
| Calculated Head | | 100.0 | 100.0 | 100.0 | 100.0 | 100.0 |
| Cleaned Concentrate | | 67.1 | 80.5 | 83.6 | 11.9 | 68.6 |
| Cleaner Tailings | | 7.8 | 3.9 | 4.8 | 8.9 | 8.1 |
| Rougher Tailing | | 25.1 | 15.6 | 11.6 | 79.2 | 23.3 |

*Example 3*

A bauxite ore analyzing 52.07% $Al_2O_3$, 4.06% $Fe_2O_3$, 4.40% $TiO_2$, 0.67% $ZrO_2$, 12.96% $SiO_2$ and having a loss on ignition of 25.84% was ground to +35 mesh, treated with 4 lbs./ton $Na_2SiO_3$ and deslimed. The deslimed ore was washed with water containing 1 lb./ton $Na_2SiO_3$ and then conditioned for 2 minutes at 60% solids with 6 lbs./ton water-soluble petroleum sulfonate, 6 lbs./ton fuel oil and 2 lbs./ton sulfuric acid. The conditioned ore was diluted to 12.2% solids and floated for 2 minutes. The pH during flotation was about 3.1. The flotation concentrate was separated into a heavy minerals concentrate and an alumina tailing on a Wilfley table. The separated products had the following analyses:

| Product | Percent Weight | Assays | | | | | |
|---|---|---|---|---|---|---|---|
| | | Percent $Al_2O_3$ | Percent $Fe_2O_3$ | Percent $TiO_2$ | Percent $ZrO_2$ | Percent $SiO_2$ | Percent Loss on Ign. |
| Calculated Head | 100.0 | 49.48 | 5.19 | 5.16 | 1.04 | 14.29 | 24.82 |
| Flotation Conct | 73.0 | 53.02 | 6.00 | 6.41 | 1.26 | 6.41 | 26.87 |
| Table Concentrate | 11.3 | 28.86 | 22.31 | 23.05 | 5.93 | 7.55 | 12.30 |
| Table Tailing | 61.7 | 57.43 | 3.03 | 3.39 | 0.41 | 6.21 | 29.53 |
| Flot'n. Clnr. Tlgs | 13.6 | 50.27 | 4.22 | 2.63 | 0.77 | 16.74 | 25.37 |
| Flot'n. Rghr. Tlg | 13.4 | 29.47 | 1.72 | 0.79 | 0.13 | 54.71 | 13.18 |
| Distribution, Percent | | | | | | | |
| Calculated Head | | 100.0 | 100.0 | 100.0 | 100.0 | 100.0 | 100.0 |
| Flotation Concentrate | | 78.2 | 84.5 | 91.0 | 88.3 | 32.8 | 79.0 |
| Table Concentrate | | 6.6 | 48.5 | 50.5 | 64.1 | 6.0 | 5.6 |
| Table Tailing | | 71.6 | 36.0 | 40.5 | 24.2 | 26.8 | 73.4 |
| Flotat'n Cleaner Tlgs | | 13.8 | 11.1 | 6.9 | 10.0 | 15.9 | 13.9 |
| Flotat'n Rougher Tlg | | 8.0 | 4.4 | 2.1 | 1.7 | 51.3 | 7.1 |

*Example 4*

A bauxite ore analyzing 58.07% $Al_2O_3$, 1.32% $Fe_2O_3$, 3.41% $TiO_2$, 6.8% $SiO_2$ and having a loss on ignition of 30.37% was ground to +35 mesh, treated with 8 lbs./ton sodium silicate and deslimed. The deslimed ore was washed with water containing 4 lbs./ton sodium silicate and then conditioned for 2 minutes at 60% solids with 8 lbs./ton water-soluble petroleum sulfonate, 6 lbs./ton fuel oil and 2 lbs./ton sulfuric acid. The conditioned ore was reduced to 15.2% solids and floated for 2 minutes. The pH during flotation was about 4. The flotation concentrate was separated into a heavy minerals concentrate and an alumina tailing on a Wilfley table; the separated products had the following analyses:

| Product | Percent Weight | Assays | | | | |
|---|---|---|---|---|---|---|
| | | Percent $Al_2O_3$ | Percent $Fe_2O_3$ | Percent $TiO_2$ | Percent $SiO_2$ | Loss on Ignition |
| Calculated Head | 100.0 | 58.62 | 1.27 | 3.38 | 5.96 | 30.76 |
| Flotat'n Concentr | 46.8 | 60.15 | 1.25 | 3.53 | 2.92 | 32.13 |
| Table Concentrate | 0.9 | 52.15 | 7.66 | 7.25 | 5.51 | 27.43 |
| Table Tailing | 45.9 | 60.32 | 1.12 | 3.46 | 2.87 | 32.23 |
| Flot'n Clnr. Tlgs | 10.6 | 58.68 | 1.01 | 3.45 | 6.03 | 30.83 |
| Flot'n Rougher Tlg | 42.6 | 56.91 | 1.36 | 3.19 | 9.30 | 29.24 |
| Distribution, Percent | | | | | | |
| Calculated Head | | 100.0 | 100.0 | 100.0 | 100.0 | 100.0 |
| Flotation Concentrate | | 48.0 | 45.9 | 49.0 | 22.9 | 48.9 |
| Table Concentrate | | 0.8 | 5.4 | 2.0 | 0.8 | 0.8 |
| Table Tailing | | 47.2 | 40.5 | 47.0 | 22.1 | 48.1 |
| Flot'n Cleaner Tailings | | 10.6 | 8.4 | 10.8 | 10.7 | 10.6 |
| Flot'n Rougher Tailing | | 41.4 | 45.7 | 40.2 | 66.4 | 40.5 |

*Example 5*

A bauxite ore analyzing 52.98% $Al_2O_3$, 4.35% $Fe_2O_3$, 2.87% $TiO_2$, 12.05% $SiO_2$ and having a loss on ignition of 27.79%, was ground to −35 mesh, treated with 6 lbs./ton sodium silicate and deslimed; the deslimed ore was conditioned for two minutes at 60% solids with 6 lbs./ton of a water-soluble petroleum sulfonate, 6 lbs./ton fuel oil and 2 lbs./ton sulfuric acid. The conditioned ore was reduced to 10% solids and floated for 2 minutes. The pH during flotation was 3.6. The flotation concentrate was separated into a heavy minerals concentrate and an alumina tailing on a Wilfley table; the separated products had the following analyses:

| Product | Percent Weight | Assays | | | | |
|---|---|---|---|---|---|---|
| | | Percent $Al_2O_3$ | Percent $Fe_2O_3$ | Percent $TiO_2$ | Percent $SiO_2$ | Loss on Ignition |
| Calculated Head | 100.0 | 52.42 | 7.18 | 2.32 | 8.66 | 29.52 |
| Flotation Concentr. | 76.2 | 53.10 | 7.44 | 2.45 | 6.47 | 30.51 |
| Table Concentrate | 6.3 | 19.94 | 41.10 | 2.65 | 9.78 | 26.53 |
| Table Tailing | 69.9 | 56.11 | 4.40 | 2.44 | 6.17 | 30.88 |
| Flotat'n Clnr. Tlgs. | 10.8 | 51.09 | 6.26 | 1.96 | 13.10 | 27.59 |
| Flotat'n Rghr. Tlg. | 13.0 | 49.40 | 6.51 | 1.88 | 17.83 | 25.28 |

| | Distribution, Percent | | | | |
|---|---|---|---|---|---|
| Calculated Head | 100.0 | 100.0 | 100.0 | 100.0 | 100.0 |
| Flotation Concentrate | 77.2 | 78.8 | 80.4 | 56.9 | 78.8 |
| Table Concentrate | 2.4 | 36.0 | 7.2 | 7.1 | 5.7 |
| Table Tailing | 74.8 | 42.8 | 73.2 | 49.8 | 73.1 |
| Flotation Cleaner Tailings | 10.5 | 9.4 | 9.1 | 16.3 | 10.1 |
| Flotation Rougher Tailing | 12.3 | 11.8 | 10.5 | 26.8 | 11.1 |

*Example 6*

The ore of Example 5 was processed in a similar manner, except that 5 lbs./ton of oil-soluble petroleum sulfonate was substituted for the fuel oil and water-soluble petroleum sulfonate. The cleaned and recleaned concentrate was passed over a laboratory Wilfley table to separate the heavy minerals; the separated products had the following analyses:

| Product | Percent Weight | Assays | | | | |
|---|---|---|---|---|---|---|
| | | Percent $Al_2O_3$ | Percent $Fe_2O_3$ | Percent $TiO_2$ | Percent $SiO_2$ | Loss on Ignition |
| Calculated Head | 100.0 | 52.32 | 7.53 | 2.30 | 8.32 | 29.51 |
| Flotation Concentr. | 52.3 | 54.07 | 7.88 | 2.52 | 4.45 | 31.06 |
| Table Concentrate | 7.1 | 30.85 | 31.80 | 3.57 | 5.63 | 28.15 |
| Table Tailing | 45.2 | 57.73 | 4.12 | 2.36 | 4.27 | 31.52 |
| Flot'n Cleaner Tlgs. | 16.3 | 51.39 | 8.55 | 2.05 | 8.57 | 29.44 |
| Flot'n Rougher Tlg. | 31.4 | 49.87 | 6.44 | 2.07 | 14.63 | 26.99 |

| | Distribution, Percent | | | | |
|---|---|---|---|---|---|
| Calculated Head | 100.0 | 100.0 | 100.0 | 100.0 | 100.0 |
| Flotation Concentrate | 54.1 | 54.7 | 57.3 | 28.0 | 55.1 |
| Table Concentrate | 4.2 | 30.0 | 11.0 | 4.8 | 6.8 |
| Table Tailing | 49.9 | 24.7 | 46.3 | 23.2 | 48.3 |
| Flotation Cleaner Tailings | 16.0 | 18.5 | 14.5 | 16.8 | 16.2 |
| Flotation Rougher Tailing | 29.9 | 26.8 | 28.2 | 55.2 | 28.7 |

*Example 7*

A bauxite ore analyzing 52.83% $Al_2O_3$, 2.54% $Fe_2O_3$, 2.78% $TiO_2$, 16.01% $SiO_2$ and having a loss on ignition of 25.82%, was ground to +35 mesh, treated with 7 lbs./ton sodium silicate and deslimed; the deslimed ore was conditioned for 2 minutes at 60% solids with 6 lbs./ton water-soluble petroleum sulfonate, 6 lbs./ton fuel oil, and 2 lbs./ton sulfuric acid. The conditioned ore was reduced to 11.3% solids with water and floated for 2 minutes. The pH during flotation was about 3.6. The cleaned and recleaned flotation concentrate was passed over a laboratory Wilfley table to separate the heavy minerals. The separated products had the following analyses:

| Product | Percent Weight | Assays | | | | |
|---|---|---|---|---|---|---|
| | | Percent $Al_2O_3$ | Percent $Fe_2O_3$ | Percent $TiO_2$ | Percent $SiO_2$ | Loss on Ignition |
| Calculated Head | 100.0 | 56.01 | 2.61 | 2.61 | 9.87 | 28.91 |
| Flotation Concentrate | 69.3 | 57.33 | 2.59 | 2.78 | 7.13 | 30.16 |
| Table Concentrate | 1.4 | 35.76 | 23.45 | 13.98 | 6.35 | 20.46 |
| Table Tailing | 67.9 | 57.77 | 2.17 | 2.55 | 7.15 | 30.36 |
| Flotation Cleaner Tailings | 14.5 | 54.10 | 2.50 | 2.43 | 13.87 | 27.10 |
| Flotation Rougher Tailing | 16.2 | 52.10 | 2.77 | 2.03 | 18.01 | 25.18 |

| | Distribution, Percent | | | | |
|---|---|---|---|---|---|
| Calculated Head | 100.0 | 100.0 | 100.0 | 100.0 | 100.0 |
| Flotation Concentrate | 70.9 | 68.9 | 73.9 | 50.1 | 72.3 |
| Table Concentrate | 0.9 | 12.5 | 7.5 | 0.9 | 1.0 |
| Table Tailing | 70.0 | 56.4 | 66.4 | 49.2 | 71.3 |
| Flotation Cleaner Tailings | 14.0 | 13.9 | 13.5 | 20.4 | 13.6 |
| Flotation Rougher Tailing | 15.1 | 17.2 | 12.6 | 29.5 | 14.1 |

*Example 8*

The ore of Example 7 was processed in a manner similar to that described in Example 7, except that 5 lbs./ton of oil-soluble petroleum sulfonate was substituted for the fuel oil and water-soluble petroleum sulfonate. The cleaned and recleaned flotation concentrate was passed over a Wilfley table. The separated products had the following analyses:

| Product | Percent Weight | Assays | | | | |
|---|---|---|---|---|---|---|
| | | Percent $Al_2O_3$ | Percent $Fe_2O_3$ | Percent $TiO_2$ | Percent $SiO_2$ | Loss on Ignition |
| Calculated Head | 100.0 | 56.36 | 2.59 | 2.63 | 9.60 | 28.80 |
| Floation Concent. | 51.5 | 58.77 | 2.66 | 2.81 | 4.97 | 30.78 |
| Table Concentrate | 1.2 | 44.24 | 16.44 | 12.10 | 4.37 | 22.85 |
| Table Tailing | 49.9 | 59.13 | 2.32 | 2.58 | 4.99 | 30.93 |
| Flot'n Clnr. Tlgs. | 15.8 | 55.68 | 2.70 | 2.59 | 10.38 | 28.65 |
| Flot'n Rghr. Tlg. | 33.1 | 52.95 | 2.46 | 2.39 | 16.37 | 25.83 |

| | Distribution, Percent | | | | |
|---|---|---|---|---|---|
| Calculated Head | 100.0 | 100.0 | 100.0 | 100.0 | 100.0 |
| Flotation Concentrate | 53.3 | 52.2 | 54.4 | 26.5 | 54.6 |
| Table Concentrate | 0.9 | 7.6 | 5.5 | 0.6 | 0.9 |
| Table Tailing | 52.4 | 44.6 | 48.9 | 25.9 | 53.7 |
| Flotation Cleaner Tailings | 15.6 | 16.4 | 15.5 | 17.1 | 15.7 |
| Flotation Rougher Tailing | 31.1 | 31.4 | 30.1 | 56.4 | 29.7 |

*Example 9*

Example 1 was repeated but the deslimed ore was conditioned at 30% solids instead of at 60% solids. The cleaned and recleaned flotation concentrate had the following analyses:

| Product | Percent Weight | Assays | | | | |
|---|---|---|---|---|---|---|
| | | Percent $Al_2O_3$ | Percent $Fe_2O_3$ | Percent $TiO_2$ | Percent $SiO_2$ | Loss on Ignition |
| Calculated Head | 100.0 | 48.87 | 0.78 | 4.05 | 16.17 | 24.02 |
| Flotation Concent. | 86.7 | 56.39 | 0.90 | 4.97 | 9.59 | 28.15 |
| Flotat'n Clnr. Tlgs. | 4.3 | 32.95 | 0.30 | 0.36 | 53.16 | 13.23 |
| Flotat'n Rghr. Tlg. | 9.0 | 22.24 | 0.50 | 0.31 | 68.45 | 8.50 |

| | Distribution, Percent | | | | |
|---|---|---|---|---|---|
| Calculated Head | 100.0 | 100.0 | 100.0 | 100.0 | 100.0 |
| Flotation Concentrate | 93.0 | 92.6 | 98.9 | 47.8 | 94.4 |
| Flotation Cleaner Tailings | 2.9 | 1.6 | 0.4 | 14.1 | 2.4 |
| Flotation Rougher Tailing | 4.1 | 5.8 | 0.7 | 38.1 | 3.2 |

We claim:
1. A method of beneficiating bauxite-containing ores which comprises conditioning in an acid circuit with a petroleum sulfonate a deslimed ore ground to about 35 mesh; and floating to recover a flotation concentrate rich in $Al_2O_3$ and low in silica.
2. A method according to claim 1 in which said petroleum sulfonate is an oil-soluble petroleum sulfonate.
3. A method according to claim 1 in which said petroleum sulfonate is a mixture of oil-soluble and water-soluble petroleum sulfonates.
4. A method of beneficiating bauxite-containing ores which comprises conditioning in an acid circuit with a water-soluble petroleum sulfonate and fuel oil a deslimed ore ground to about 35 mesh; and floating to recover a flotation concentrate rich in $Al_2O_3$ and low in silica.
5. A method according to claim 1 in which the beneficiated flotation concentrate is passed over a table to give a heavy mineral fraction and a light mineral fraction rich in $Al_2O_3$.
6. A method according to claim 1 in which the beneficiated flotation concentrate is passed over a table to give a heavy mineral fraction containing columbium and a light mineral fraction rich in $Al_2O_3$.
7. A method according to claim 2 in which the beneficiated flotation concentrate is passed over a table to give a heavy mineral fraction and a light mineral fraction rich in $Al_2O_3$.
8. A method according to claim 3 in which the beneficiated flotation concentrate is passed over a table to give a heavy mineral fraction and a light mineral fraction rich in $Al_2O_3$.
9. A method according to claim 4 in which the beneficiated flotation concentrate is passed over a table to give a heavy mineral fraction and a light mineral fraction rich in $Al_2O_3$.

References Cited in the file of this patent

UNITED STATES PATENTS

| | | |
|---|---|---|
| 2,433,258 | Booth | Dec. 23, 1947 |
| 2,442,455 | Booth et al. | June 1, 1948 |
| 2,483,192 | Gieseke | Sept. 27, 1949 |

FOREIGN PATENTS

| | | |
|---|---|---|
| 1,008,456 | France | May 19, 1952 |

OTHER REFERENCES

U. S. Bureau of Mines Report of Investigations R. I. 3586, dated September 1941, "Report on the Flotation of Bauxite," 26 pages, note particularly pages 4 and 18. (Copy in Scientific Library.)